US005533614A

United States Patent [19]
Walker

[11] Patent Number: 5,533,614
[45] Date of Patent: Jul. 9, 1996

[54] DISPLAY HOLDER FOR OPTICALLY READ DISCS

[76] Inventor: Joshua J. Walker, 2590 S. Fillmore St., Denver, Colo. 80210

[21] Appl. No.: 294,756

[22] Filed: Aug. 23, 1994

[51] Int. Cl.[6] .............................. B65D 85/57; A47G 29/00
[52] U.S. Cl. ...................... 206/308.1; 206/310; 206/445; 211/40
[58] Field of Search ............................... 206/308.1, 310, 206/309, 445; 211/40

[56] References Cited

U.S. PATENT DOCUMENTS

| | | | |
|---|---|---|---|
| 4,499,994 | 2/1985 | Rentch | 206/310 X |
| 4,819,799 | 4/1989 | Nomula et al. | 206/310 |
| 4,867,306 | 9/1989 | Factor | 206/309 |
| 4,940,147 | 7/1990 | Hunt | 211/40 |
| 4,951,826 | 8/1990 | Tompkins | 211/40 |
| 5,040,687 | 8/1991 | Whittington | 211/40 |
| 5,090,561 | 2/1992 | Spector | 206/308.1 X |
| 5,290,118 | 3/1994 | Ozeki | 206/308.1 X |

FOREIGN PATENT DOCUMENTS 0205589  8/1990  Japan ...................................... 206/310

*Primary Examiner*—Bryon P. Gehman

[57] ABSTRACT

A wall mounted display holder for optically read discs, preferably compact discs. A rigid main panel (12) has one or more recesses (20) formed in its forward surface. Clasps (16) are affixed to projections (14) which are in turn affixed to the inner surface of recesses (20). Discs (30) are removably mounted on clasps (16) in a plane approximately parallel to forward surface of display holder (10). Recesses (20), and projections (14) are of sufficient size to allow user's fingers to easily grasp the outer edge of a disc (30) without interference from the main panel (12). Pressure may be applied to clasp (16) through central aperture (22) of disc (30), to prevent display holder (10) being pulled from wall during removal of disc (30).

5 Claims, 5 Drawing Sheets

DISPLAY HOLDER FOR OPTICALLY READ DISCS

BACKGROUND OF THE INVENTION

1. Field of the Invention

This invention relates generally to a display and storage device for optically read discs, and more specifically to a novel wall mounted display and storage unit for compact discs.

2. Description of Prior Art

Numerous storage units have been provided in the prior art. For example, U.S. Pat. Nos. 4,951,826 of Tompkins; 4,940,147 of Hunt, 4,867,306 of Factor, 5,040,687 of Whittington, 4,819,799 of Nomula et al., and 4,499,994 of Rentch.

In the patent to Tompkins, U.S. Pat. No. 4,951,826, a compact disc display and storage board is disclosed. In the Tompkins construction, only the cases holding the discs are displayed. The attractive faces of the discs themselves are not displayed as in the present invention. Also, when arranging or rearranging the display, a fastener means must be attached to every case prior to being displayed.

The wall-mounted compact disc container display of Whittington, U.S. Pat. No. 5,040,687 suffers the exact same limitations as Tompkins by displaying only the plastic disc cases, and by using detachable fasteners on every container displayed.

The visual compact disc wall rack of Hunt, U.S. Pat. No. 4,940,147, suffers from the same shortcomings, plus a minimum number of ten separate parts, as set forth in the claims, thus also making it prohibitive in cost to manufacture.

The compact disc storage rack of Factor, U.S. Pat. No. 4,867,306, also displays only the disc case. It does not display the attractive surface and artwork on the disc itself, as in the present invention.

In the patent of Rentch, U.S. Pat. No. 4,499,994, a holder is disclosed for phonograph records or record sleeves. This holder in its complete claimed form, provides a display for a vinyl record or its sleeve, and encloses such completely in a frame with a transparent front member. It thus varies greatly from the present invention in overall function, ease of use, and cost of manufacture.

The Patent to Nomula et al., U.S. Pat. No. 4,819,799 also varies greatly from the present invention in design and function. As in the Rentch construction, the disc is completely enclosed. In the Nomula et al. design, a single disc and its sleeve are both displayed for retail sale in a fully enclosed package, with its large size designed to deter shoplifting.

While these units might be suitable for the particular purposes which they address, they do not display the faces of the discs in a simple to manufacture single piece design, while allowing direct access to the discs when needed, and thus would not be suitable for the purpose of the present invention as hereafter described.

SUMMARY OF THE INVENTION

Optically read discs, or more specifically compact discs, have a shiny, iridescent surface often decorated with attractive artwork.

The attractive face of a disc is usually viewed only when a disc is being removed from its case for use in a disc player, or while being returned to its case after use.

The applicant herein has discovered that such discs lend themselves to being conveniently and aesthetically displayed on a wallhanging. In this way the attractive surface and graphic works on the faces of the discs may be displayed as a decorative feature on a wall.

One additional advantage of the present invention is that it provides ease of access to the discs when needed.

Conventionally, when a disc is to be played, the case holding that particular disc must be located. The case must then be removed from its stored position, then opened using both hands to pivot the case open. The disc must then be removed while the case is held with the other hand. The disc is then placed into the player and the case is set down. Thus, many steps are involved, and the artwork on the disc is seen only while the disc is being transferred from its case to the player.

Display of the discs themselves on a wallhanging, as in the present invention, is therefore not only decorative, but allows the owner to easily locate a disc, then detach the disc with one hand and place it directly into the disc player.

It is therefore a general object of the present invention to provide a new and novel compact disc display and storage board that will overcome the shortcomings of the prior art devices.

Another object of the present invention is to permit an owner to display the attractive surfaces and graphic artwork on the faces of the discs themselves.

A further object of the present invention is to provide a storage and display board from which discs may be easily located and removed for use in a disc player.

Another object of the present invention is to provide a display holder that by clasping only the central aperture of the disc, and by spacing the disc from the display holder, does not contact or damage the optically read surface of the discs.

Yet another object of the present invention is to allow the user to remove a disc from the display holder with only one hand, using the thumb and second finger to grasp the disc. At the same time the user can hold the display holder firmly against the wall and release the clasp by pressing the central clasping means with the first finger of the same hand.

A still further object of the present invention is to provide a compact disc display holder which can be easily and economically manufactured as a single molded piece.

These and other objects and advantages will be readily apparent to those of ordinary skill in the art.

DETAILED DESCRIPTION OF THE PREFERRED EMBODIMENT

Figure 1:
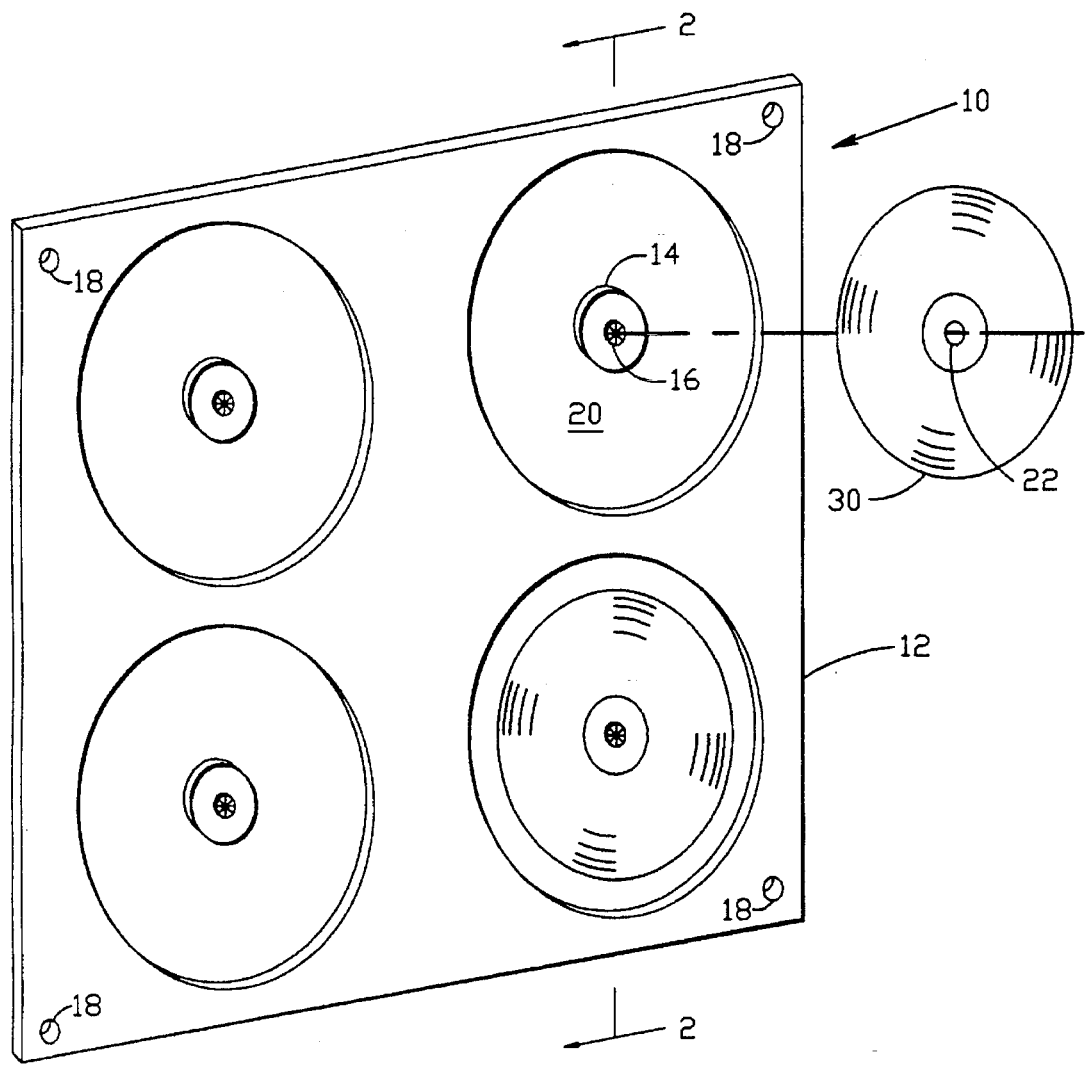
FIG. 1 is a perspective view of one embodiment of a display holder for optically read discs according to the present invention. The holder is shown with one disc adjacent to holder and one disc removably mounted thereon.
Figure 2:
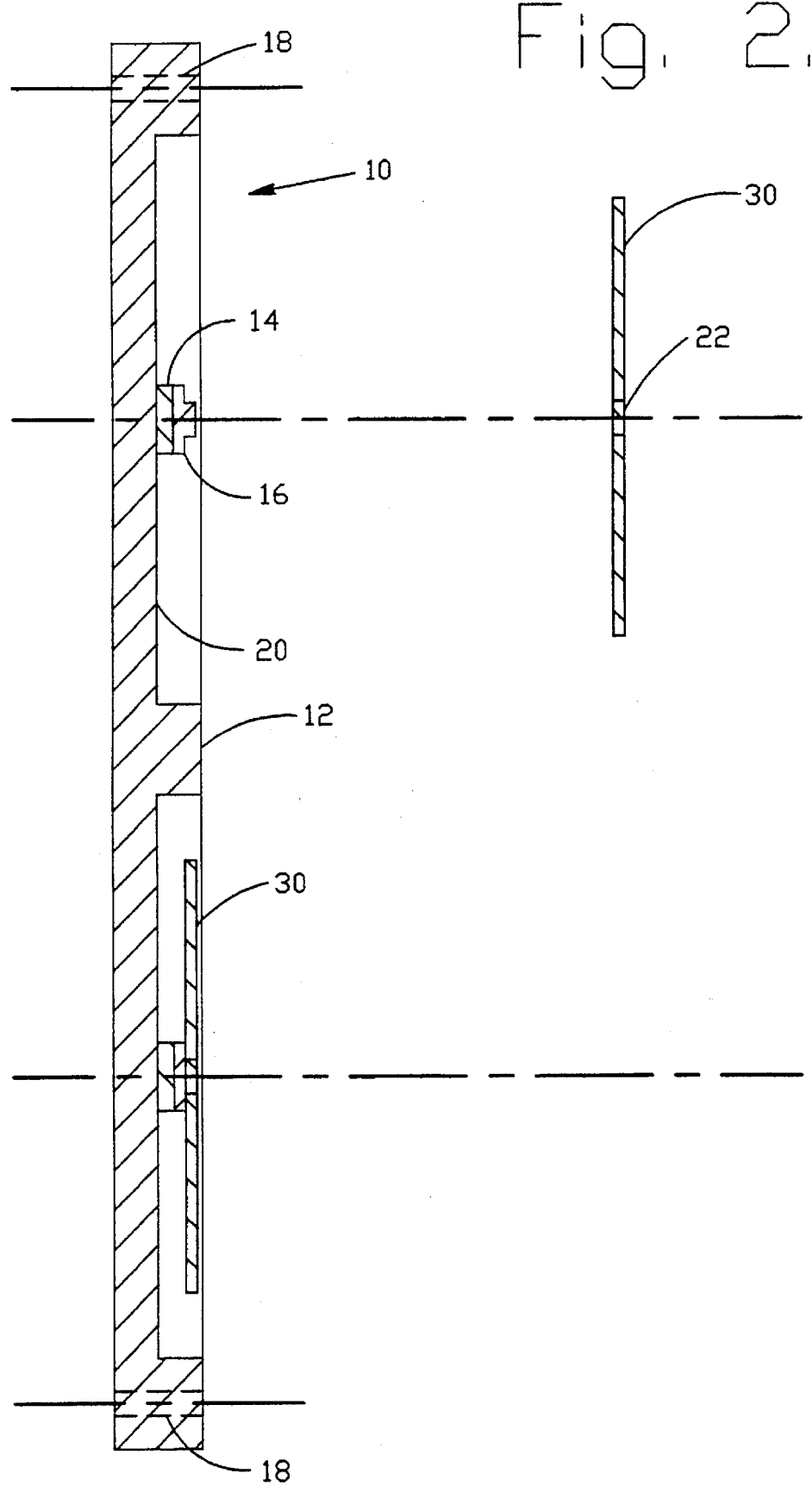
FIG. 2 is a vertical sectional view taken on line 2—2 of FIG. 1, showing one disc adjacent to the display holder, and one disc removably mounted thereon.

Turning now descriptively to the drawings, in which like reference characters denote like elements throughout the several views, and more particularly to FIG. 1, the preferred embodiment of a display holder for optically read discs is identified generally at 10, and is shown to include a rigid panel 12, having four cylindrical recesses 20 formed in its forward surface.

Each clasping means 16 is affixed to a projection 14 in the center of each recess 20.

Each clasping means 16 is capable of removably receiving one optically read disc 30 in a plane approximately parallel to the forward surface of rigid panel 12.

Figure 3:
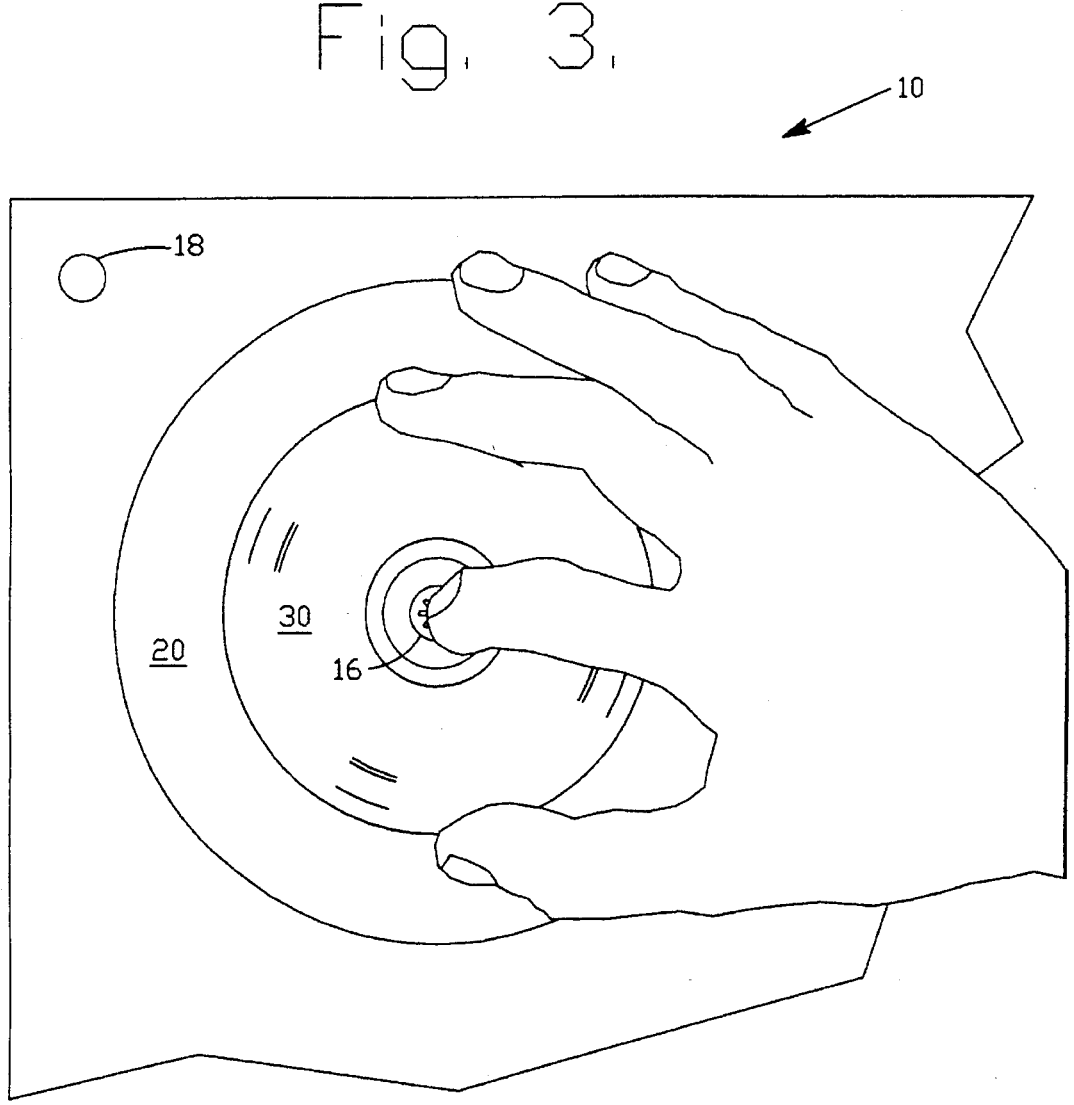
FIG. 3 is a plan view showing user removing a disc from the display holder by grasping the outer edge of the disc with thumb and second finger, while applying pressure to central clasping means with first finger of same hand.

Referring now to FIG. 3, each cylindrical recess 20 is of sufficient diameter to allow a user's fingers to easily grasp outer edge of disc 30. Also, each projection 14 spaces each disc 30 from base of recess 20 a sufficient distance to allow user's fingers to easily grasp outer edge of disc 30, without interference from rigid panel 12. The storage of discs 30 inside recesses 20 prevents discs 30 from accidentally being knocked loose from display holder 10, and protects discs 30 from contamination from falling dust particles.

Figure 4A:
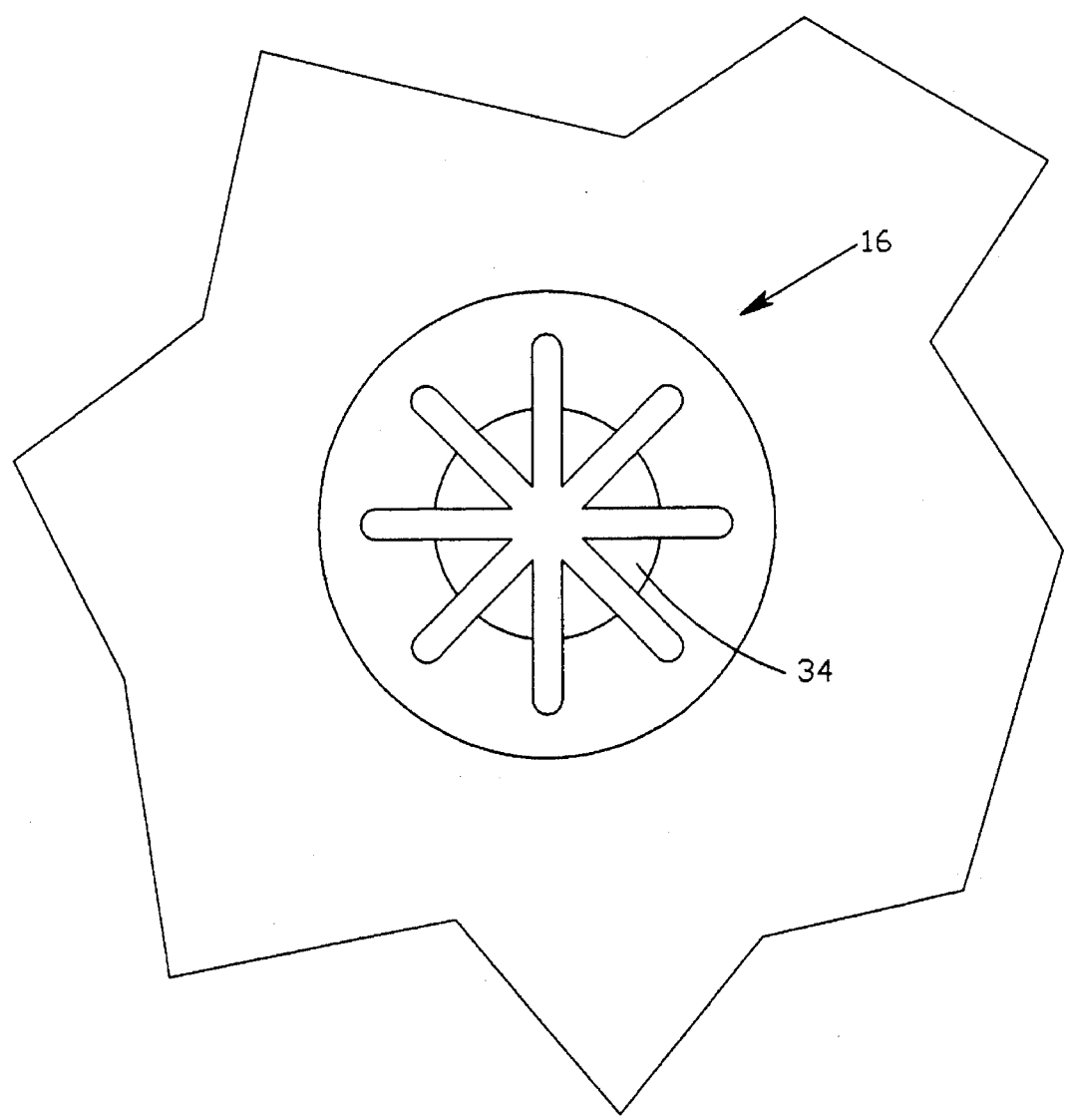
FIG. 4a is a plan view of one prior art clasp and FIG. 4b is a cross sectional view of the same clasp, as used in the preferred embodiment.
Figure 4B:
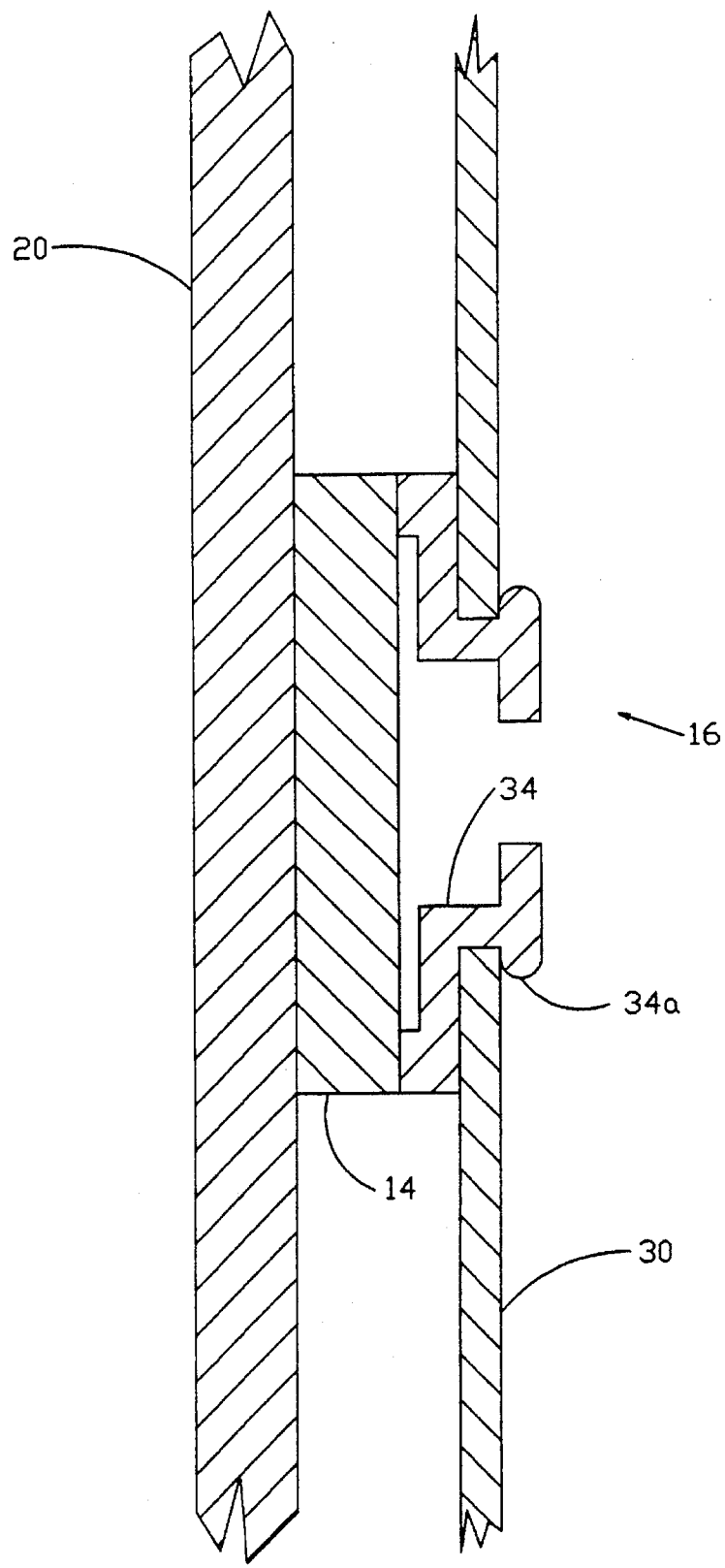

The prior art clasping means 16 shown in the preferred embodiment is detailed in FIGS. 4a and 4b. The radially arranged flaps 34 are cantilevered at their outer ends, and have a cranked cross section as shown in FIG. 4b. When pressure is applied through user's finger to flaps 34, the flaps 34 including disc engaging protrusions 34b flex inward and toward rigid panel 12 thus releasing their grip on disc central aperture 22. The disc 30 may then be easily removed from display holder 10.

In use, a disc 30 is removed from the display holder by grasping its outer edge with the thumb and second finger of one hand. The disc 30 is then pulled from the display holder 10 while pressure is applied with the first finger of the same hand to clasp 16, through disc central aperture 22, as shown in FIG. 3.

Pressure applied to clasp 16 releases the disc from the clasp 16 and prevents display holder 10 being pulled from wall during removal of disc 30. When reattaching a disc 30 to the display holder 10, the disc 30 is simply pressed back onto clasping means 16.

Four mounting holes 18 extend through rigid panel 12 at a predetermined distance from each corner of rigid panel 12, to facilitate wall mounting of display holder 10.

Whereas the invention has been shown and described only as the preferred embodiment thereof, it will be understood that many modifications to this embodiment may be made which are within the scope of the appended claims.

For example, the display holder may have a sufficient number of clasping means for storage and display of one, or any number of discs, and any of a number of different hole clasp types may be used.

Also, the previously mentioned recesses may be of a shape other than cylindrical, or may receive more than one disc in each recess. Also, the recesses may be eliminated altogether, all without affecting the intended function of the display holder.

Similarly, the display holder may be hung on a wall with double-sided mounting tape, or by other means not requiring use of the mounting holes.

Also, the display holder may be produced as a single molded piece including the spacing projections and clasping means.

Thus, many changes may be made by those skilled in the art, without departing from the spirit or function of the present invention.

I claim:

1. An open-faced compact disc display rack comprising a substantially flat and rigid support panel, said panel having a forward surface and a substantially planar rearward surface, said forward surface including one or more recessed areas, said forward surface having a projection extending from each said recessed area, said projections each including a clasping means, each clasping means removably receiving a compact disc within its corresponding recessed area against its corresponding projection to define a completely spaced relationship of said compact disc with said support panel, each received compact disc being in a plane substantially parallel to the forward surface of its corresponding recessed area, said support panel having through holes to allow mounting of the panel to a wall.

2. The open-faced compact disc display rack of claim 1 wherein said compact disc display rack is constructed as a single molded piece.

3. A wall hanging display for compact discs, the display comprising an integrally molded panel having a forward surface and a substantially planar rearward surface, the display including:
   (a) at least one recessed area in the forward surface of said integrally molded panel for receiving a compact disc,
   (b) a clasping means affixed within each recessed area, each said clasping means being adapted to clasp the central aperture of a compact disc,
   (c) each said clasping means projecting from the forward surface of its corresponding recessed area,
   (d) wherein each said clasping means removably holds a compact disc within its corresponding recessed area in a completely spaced relationship with said panel, each compact disc being substantially parallel to the forward surface of its recessed area, and
   (e) said panel having through holes to allow mounting of the panel to a wall.

4. A display holder of molded construction for displaying a plurality of individually unencased compact discs, said display holder comprising:
   (a) a rigid panel having a contoured forward surface and a substantially planar rearward surface, said forward surface including at least one recess, each said recess being of sufficient size to house a compact disc,
   (b) each said recess including a projection, each said projection having a clasp thereon, wherein each said clasp removably clasps the central aperture of a compact disc to said projection to define a completely spaced relationship between the compact disc and the panel, the clasped compact disc lying in a plane substantially parallel to the forward surface of its corresponding recess, and
   (c) the panel further including through holes to allow mounting of the holder to a wall.

5. The display holder of claim 4, wherein said display holder is molded as a single plastic piece.

* * * * *